United States Patent Office 3,737,326
Patented June 5, 1973

3,737,326
BEVERAGE CONTAINING EGG ALBUMEN AND WHEY
Jude A. Basso, Normand A. Lemaire, and Charles V. Fulger, Battle Creek, Mich., assignors to Kellogg Company, Battle Creek, Mich.
No Drawing. Continuation-in-part of application Ser. No. 801,142, Feb. 20, 1969. This application July 23, 1971, Ser. No. 165,720
Int. Cl. A23l 1/00; A23c 21/00
U.S. Cl. 99—78        9 Claims

ABSTRACT OF THE DISCLOSURE

Beverage mix containing sweetener, color, flavor, food acid, and as the source of protein, egg albumen and whey. The whey constitutes from about 20% to about 50% of the protein of the albumen and whey mixture and inhibits the taste and odor of the egg albumen in the final beverage.

CROSS REFERENCE

This application is a continuation-in-part of our copending application Ser. No. 801,142, filed Feb. 20, 1969, now abandoned.

BACKGROUND OF THE INVENTION

This invention relates to dry food products which are reconstitutable by the addition of water and more particularly to a dry beverage mix containing albumen and whey as the sole sources of protein, the solution of which within a predetermined pH range is free of the taste and odor of eggs as well as the chalky taste of whey.

Various attempts have been made to fortify dry beverage mixes with protein, with the object of supplying a totally soluble and palatable food product containing relatively high levels of protein, especially in acid solution. Many abundant protein sources, however, cannot be employed in beverage mixes because of their undesirable characteristic flavor or odor. Also, many protein sources are not totally soluble in water and are denatured under acidic conditions and tend to precipitate out of solution.

Egg albumen has been employed in dry form as a protein additive to beverages or other food products because of its good solubility and very high protein qualities. It would therefore be desirable to employ albumen as a primary source of protein in beverage mixes, but the albumen, especially in water solution, contributes a characteristic egg flavor and odor, which is unacceptable to many people and undesirable in fruit or vegetable drinks. For this reason, albumen has been employed only as a minor ingredient or protein source in beverages, such that the bulk of the other protein and additoinal ingredients predominate in the final product.

In the Pat. No. 2,919,195 to Block, for example, the proposal is made to employ egg albumen in a beverage mix particularly suitable for addition to orange or other natural citrus juice. The contribution of albumen to total protein addtives, and other ingredients however, is relatively small, and the problem of an unpleasant egg taste or flavor is not realized or treated. Others employ combinations of egg solids or egg albumen and additional protein sources, such as whey solids, but only in connection with food products wherein egg flavor and odor is desired, or where the effect of the albumen addition is to be later greatly diluted or dissipated, such as by baking with other ingredients. Illustrative of the foregoing are the patents to Thies No. 3,143,427 and Jones No. 3,475,180, which describe typical egg products containing whey, without dealing with the problems referred to above and without suggesting a water reconstitutable beverage mix.

BRIEF SUMMARY OF THE INVENTION

In connection with the preparation of flavored beverage mixes, we have discovered that egg albumen may be employed in relatively large proportions without detriment to flavor or odor if within an acidic pH range an amount of whey solids is also incorporated into the mix. The albumen and whey constitute essentially the sole sources of protein in the final mix, with the albumen contributing from about 40% to about 80% of the total protein, and the protein in the whey contributing the remainder. An amount of dextrin or sucrose may also be incorporated by suitable methods into the mix at various stages to enhance solubility or to provide sweetness. Also, sufficient food acid is added such that the water solution of the mix will exhibit a pH of about from 2.5 to 4.6 and enable the albumen flavor and odor to be inhibited or eliminated by the whey. In addition, coloring and flavoring agents are added to the mix, such that the reconstituted beverage will have a pleasant and palatable taste, appearance and aroma, as well as a high nutritional value. The resulting beverage mix may be rendered into a form that is readily soluble in water and retains substantially complete solubility in acidified solutions that simulate natural fruit or vegetable beverages.

DESCRIPTION OF THE PREFERRED EMBODIMENT

In accordance with the preferred embodiment of the invention, the protein ingredients are prepared in dry form to attain relatively high concentrations of protein that are also stable in acid solution. In the preparation of albumen, liquid or solubilized egg whites may be first treated with a food acid, and the resulting filtrate is then dried by conventional methods. The egg albumen may be provided in fresh, frozen or other suitable form and may be treated with a food acid such as citric, tartaric, malic, fumaric or the like in amounts of from about 0.5% to 10% by weight of the liquid mixture and adequate to provide a pH of from about 3.5 to about 4.5. The liquid mixture is stirred thoroughly to dissolve the food acid and cause the denaturation and precipitation of a fraction of the proteins in the liquid egg albumen. The denatured and precipitated fraction of the protein is then removed by suitable means such as centrifugation and the remaining soluble fraction of the protein recovered in a yield of approximately 88–90% by weight. The acid stabilized filtrate is then suitably dried under mild conditions such as by freeze drying, vacuum drying or spray drying to prevent further denaturation of the protein, and then pulverized if not already in such condition.

In beverage mixes where a degree of sweetness is desired, we have found that the solubility of the final mix may be enhanced by incorporating or dissolving an amount of dextrins, sucrose, or other suitable carbohydrate materials or mixtures thereof into the liquid albumen filtrate and by drying the composite solution in accordance with any of the drying methods described above, preferably by spray drying. The amount of dextrins or sucrose to be dissolved in the liquid albumen filtrate may vary in accordance with the final taste characteristics required in the final product and with limitations inherent in the drying method employed, but amounts in the order of from about 1.0% to about 50% by weight of the liquid provide beneficial results without detriment to the quality of the product.

The whey is preferably provided in dry or liquid form and may be separately added in dry form to the dried albumen or dextrin-albumen, or may be incorporated into the mixture by other methods hereinafter described. Although the whey may be employed in any convenient form without further processing, it is preferable that the whey be at least partially delactosized and demineralized in order to increase the relative proportion of protein therein. Thus, whereas natural whey solids may comprise 11% protein with the remainder substantially as lactose and ash, the modified whey solids may contain up to 35% or more protein, thereby providing a richer source of protein while decreasing the relative amount and characteristic flavor of lactose.

The whey solids, when mixed directly with the dry albumen or albumen-dextrines, may be added in sufficient quantities to contribute from about 20 to about 50% of the total protein, but preferably constitute from about 30% to about 45% of the total, with the remainder of the protein being provided by the albumen. The whey, when maintained within the above stated ranges, serves to inhibit the egg flavor and odor of the albumen; albumen inhibits the flavor of the whey; and additionally, the prescribed addition of whey optimizes the palatability and mouth feel of the beverage and minimizes foaming.

If the protein contribution of whey is below 20 or 25 percent, the resulting beverage will exhibit egg flavor and/or odor and may not be entirely stable. If the protein contribution of whey is above approximately 50 percent (or in the order of at least about 60% with modified whey), the whey will impart a noticeable chalky flavor to the beverage.

An alternative and preferred method of incorporating the whey into the beverage mix is to dissolve the liquid or solid whey into the liquid albumen filtrate or albumen-dextrin solution prior to drying, and then drying the resulting solution to solid form. By this method, the solubility of the mix is improved over the method by which the whey is separately added.

After the protein or protein-dextrin or -sucrose mixture has been prepared by any of the aforesaid methods, an amount of food acid, such as citric, fumaric or malic, or mixtures thereof, is incorporated into the dry mix in sufficient quantities such that the resulting beverage will exhibit an acid pH in the order of from about 1.95 to about 7.0, preferably in the order of about 2.5 to about 4.6. If the pH does not fall within the minimum and maximum levels indicated, the egg flavor and odor of the albumen will not be effectively inhibited. In the case of fruit-type or citrus drinks, the resulting pH is preferably in the order of about 3.4 to about 4.0 with approximately 3.8 being optimal. In the case of vegetable-type drinks, such as tomato, the resulting pH is in the order of about 3.7 to about 4.6, with 4.1 being optimal.

Normally, at least a majority of the food acid that is required in the final product is added to the liquid prior to the drying thereof. The resulting solution is then dried, preferably by spray methods, to yield a composite acid-whey-albumen mixture. From the foregoing, it will be understood each of the whey, dextrins, or food acid or any combination thereof may be dissolved in the liquid albumen filtrate prior to the drying thereof.

If required, sucrose may also be added to the protein base or mix in order to attain the desired sweetness level in the resulting beverage. Suitable flavors, such as orange, grapefruit, pineapple, tomato, raspberry, or others, are also added, together with a suitable coloring agent. Other appropriate additives may include natural dried fruit pulps, fortifiers, such as vitamins and minerals, antifoaming agents, and the like. The resulting composition is then mixed, and suitable wetting agents may be added concurrently with mixing. The resulting mix is then ready for use, although a further treatment step may comprise instantizing by agglomerating the mixture. Also, the food acid, as well as sugar, may be added to the other materials which have previously been agglomerated and dried.

The resulting mix is a free flowing powder or agglomerate that is completely storage stable at room temperatures and for extended periods of time. In order to prepare a beverage for consumption, about 15% to 30% by weight of the mix is dissolved in water. The mix is readily dissolved in cold water and the resulting solution remains stable for relatively long periods of time.

As an alternative, all necessary ingredients may be combined in the form of a concentrated solution and stored in containers as a frozen concentrate.

For the purpose of illustration, the following are specific examples of the use of the present invention in the preparation of a breakfast type food drink:

EXAMPLE 1

The following formula was employed in the preparation of an orange flavored drink:

| Ingredients: | Amount (grams) |
|---|---|
| Dry egg albumen acid precipitated | 16 |
| Dry whey solids (11% protein) | 16 |
| Sucrose | 24 |
| Citric acid | 1.1 |
| Orange color | 0.013 |
| Orange flavor | 0.6 |

The above ingredients were mixed together, and then dissolved in 235 ml. of cold water to yield a beverage with a pleasant taste and aroma. The beverage contained about 2 grams of egg albumen per fluid ounce.

EXAMPLE 2

About 100 pounds of fumaric acid were mixed with and dissolved in 5,500 pounds of liquid egg white containing about 11% protein. About 650 pounds of precipitate were removed by filtration. About 400 pounds of dextrin, 1,220 pounds sugar and 1,320 pounds of when containing about 33% or about 440 pounds of protein were then dissolved in the liquid albumen filtrate, and the resulting solution was spray dried to yield about 3,465 pounds of a composite product containing about 915 pounds of protein, 2,490 pounds of carbohydrate and 60 pounds of fumaric acid. The resulting product was used in a beverage mix wherein the whey protein constituted about 48% of the total protein, and the egg albumen contributed the remainder.

EXAMPLE 3

About 3 pounds color, 1370 pounds sugar, 1610 pounds modified whey containing 410 pounds protein, 2222 pounds dextrin and 175 pounds fumaric acid were dissolved in acid precipitated egg albumen, and the resulting solution was spray dried to provide a basis for a beverage mix. Of the total protein, the whey constituted about 25.5% and the albumen constituted the remainder.

We claim:
1. A beverage mix reconstitutable by the addition of water consisting essentially of egg albumen, whey, sweetener, color, flavor and food acid, said egg albumen and whey constituting the sole sources of protein, said whey constituting from about 20% to about 50% of the protein of the albumen and whey mixture, said acid being present in an amount for said reconstituted beverage to attain a pH in the order of from about 2.5 to 4.6.
2. The beverage mix of claim 1 in the form of a dry powder readily reconstitutable by water into liquid form.
3. The beverage mix of claim 1 wherein the pH when dissolved is from about 3.4 to about 4.0.
4. The beverage mix of claim 1 wherein the pH when dissolved is from about 3.7 to about 4.6.
5. The beverage mix of claim 1 wherein the whey is at least partially delactosized and demineralized and contains up to at least about 35% protein by weight.
6. The beverage mix of claim 1 wherein the egg albumen is acid precipitated egg albumen.
7. The beverage mix of claim 1 wherein said sweetener comprises dextrin and sucrose.
8. A liquid drink product comprising water, flavoring, sweetening, and protein, said protein consisting essentially of egg albumen and whey, said whey constituting from about 20% to about 50% of the protein of the albumen and whey mixture and effectively inhibiting the taste and odor of eggs of said albumen.

9. The liquid drink product of claim 8 wherein the pH of the liquid is from about 1.95 to about 7.0.

References Cited

UNITED STATES PATENTS

| | | | |
|---|---|---|---|
| 2,919,195 | 12/1959 | Block | 99—105 |
| 3,475,180 | 10/1969 | Jones | 99—113 |
| 3,447,930 | 6/1969 | Francis | 99—57 |
| 2,166,070 | 7/1939 | Littlefield | 99—113 |
| 3,143,427 | 8/1964 | Thies | 99—114 |
| 3,170,804 | 2/1965 | Kline et al. | 99—210 |
| 3,062,665 | 11/1962 | Peebles et al. | 99—113 |
| 2,030,964 | 2/1936 | Clickner | 99—57 |
| 2,920,966 | 1/1960 | Heinemann | 99—113 |
| 2,992,113 | 7/1961 | Gorman et al. | 99—78 |
| 2,127,945 | 8/1938 | Tranin | 99—113 |

MORRIS O. WOLK, Primary Examiner

S. B. DAVIS, Assistant Examiner

U.S. Cl. X.R.

99—14, 19, 28, 57, 113